(No Model.)
J. E. BRYAN.
BOTTLE FILLER GUARD.
No. 572,327. Patented Dec. 1, 1896.
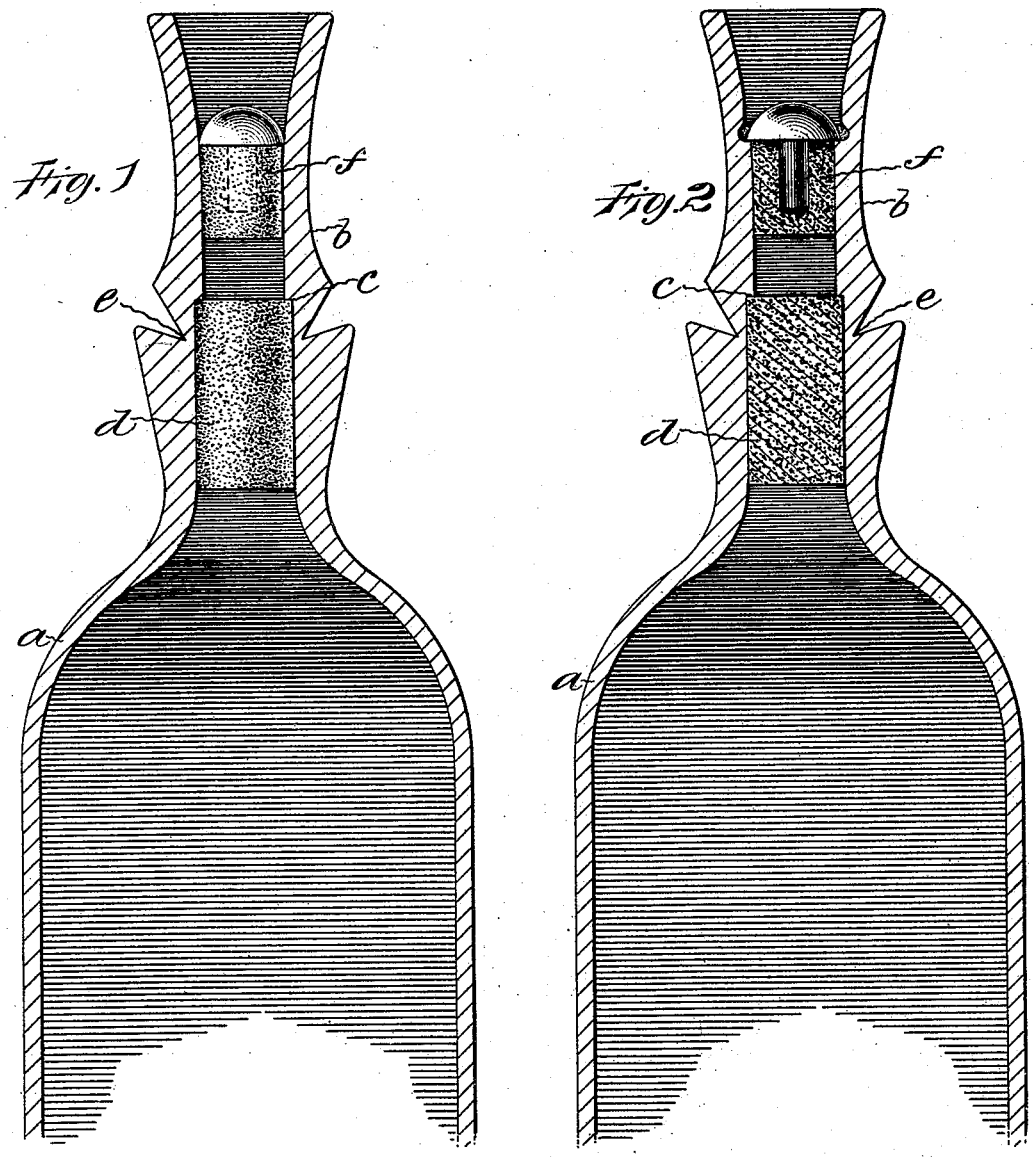
Witnesses
Andrew Ferguson
C. E. Buckland
Inventor
Joseph E. Bryan
By W. E. Simonds
Attorney

UNITED STATES PATENT OFFICE.

JOSEPH E. BRYAN, OF WEST WINSTED, CONNECTICUT.

BOTTLE-FILLER GUARD.

SPECIFICATION forming part of Letters Patent No. 572,327, dated December 1, 1896.

Application filed July 24, 1896. Serial No. 600,327. (No model.)

*To all whom it may concern:*

Be it known that I, JOSEPH E. BRYAN, a citizen of the United States of America, residing at West Winsted, in the county of Litchfield and State of Connecticut, have invented a certain new and useful Improvement in Bottle-Filler Guards, of which the following is a description, reference being had to the accompanying drawings, wherein—

Figure 1 is a view in central vertical section of a bottle embodying said improvement. Fig. 2 is a similar view illustrating a modification as regards the upper stopper.

The object of the improvement is the production of a device for preventing the refilling of a bottle or the like, after its original liquid contents are once drawn out, without notice of such refilling.

In the accompanying drawings the letter *a* denotes the body of the bottle, and *b* denotes the bottle-neck. The bottle-neck is provided with a shoulder *c*, a stopper-retaining shoulder. Any moderately elastic stopper *d*—for instance, one of cork—can be readily forced to its seat below this shoulder, but cannot be drawn out again through the neck of the bottle intact.

The letter *e* denotes an annular V-shaped notch or depression forming a relatively thin part of the bottle-neck below the shoulder *c*, reinforced above and below said notch, and in the normal use of this bottle it is designed to sever or break the neck at this annular notch or depression, leaving the stopper *d* free for extraction after the ordinary method.

The letter *f* denotes an upper stopper whose upper surface is hard, so as to repel all attacks made thereon, except it be by tools specially designed for that purpose. This upper surface is destitute of all projections or indentations which might afford a hold for a tool to catch upon, and it extends peripherally to make close contact with the inside of the bottle-neck. In Fig. 2 there is shown a modification of this upper surface of the upper stopper wherein its edge extends into a groove made in the inside of the bottle-neck, the union of the two parts being covered and closed by a suitable cement.

I claim as my improvement—

1. The bottle-neck provided with a lower cylindrical aperture, an upper cylindrical aperture of slightly smaller diameter adjoining, forming a narrow shoulder *c*, and a flaring mouth, internally, and an annular V-shaped reinforced notch *e* externally, a short distance below the said internal shoulder, substantially as specified.

2. The bottle-neck provided with a lower cylindrical aperture, an upper cylindrical aperture of slightly smaller diameter adjoining, forming a narrow shoulder *c*, and a flaring mouth, internally, and an annular V-shaped reinforced notch *e* externally, a short distance below the said internal shoulder, in combination with stoppers *d* and *f*, and the hard, round upper surface affixed to the top of stopper *f*, whereby extractive means are warded off, substantially as specified.

JOSEPH E. BRYAN.

Witnesses:
RICHARD T. HIGGINS,
ISAIAH F. CARROLL.